E. C. HAMBY.
TIRE ARMOR.
APPLICATION FILED JAN. 6, 1915.

1,198,540.

Patented Sept. 19, 1916.
2 SHEETS—SHEET 1.

Witnesses:

Inventor,
E. C. Hamby,

E. C. HAMBY.
TIRE ARMOR.
APPLICATION FILED JAN. 6, 1915.
1,198,540.
Patented Sept. 19, 1916.
2 SHEETS—SHEET 2.
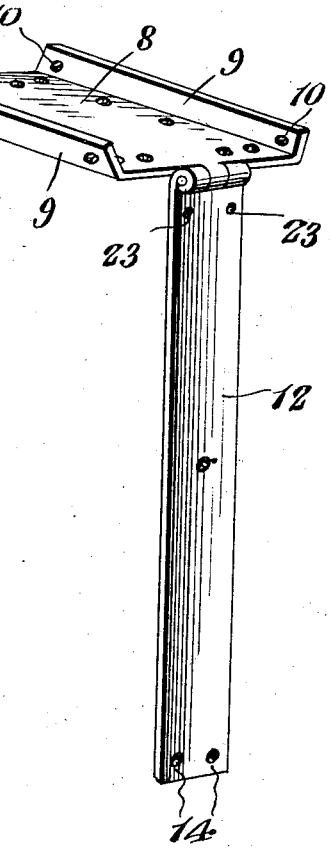
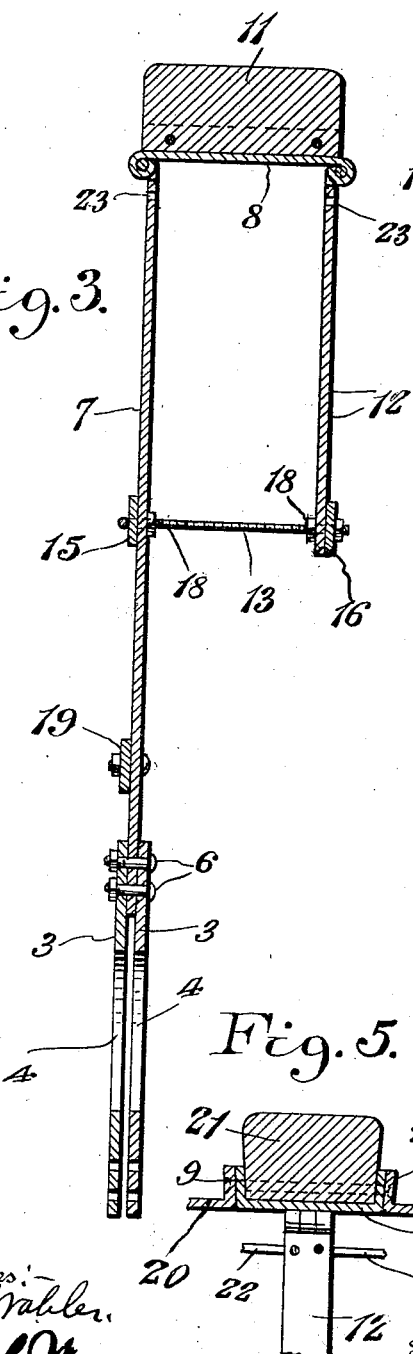
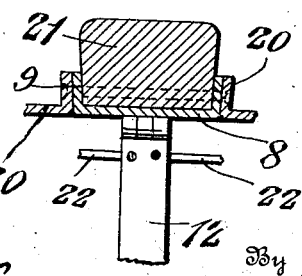
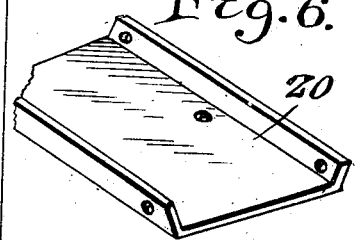
Inventor
E. C. Hamby

UNITED STATES PATENT OFFICE.

ELIAS C. HAMBY, OF MACON, GEORGIA.

TIRE-ARMOR.

1,198,540.   Specification of Letters Patent.   Patented Sept. 19, 1916.

Application filed January 6, 1915. Serial No. 847.

*To all whom it may concern:*

Be it known that I, ELIAS C. HAMBY, a citizen of the United States, residing at Macon, in the county of Bibb and State of Georgia, have invented certain new and useful Improvements in Tire-Armors; and I do hereby declare the following to be a full, clear, and exact description of the invention, such as will enable others skilled in the art to which it appertains to make and use the same.

This invention relates to exterior armor for pneumatic tires, and the primary object of the invention is to provide a skeleton wheel for mounting upon the exterior of an ordinary type of resilient or pneumatic vehicle wheels for protecting the tire and also for facilitating the movement of the vehicle through mud, sand or soft soil.
Another object of this invention is to provide an auxiliary wheel or tire armor for mounting upon the exterior of a pneumatic tire wheel, which will increase the gripping proclivities of the wheel by providing a plurality of spaced tread sections.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1:
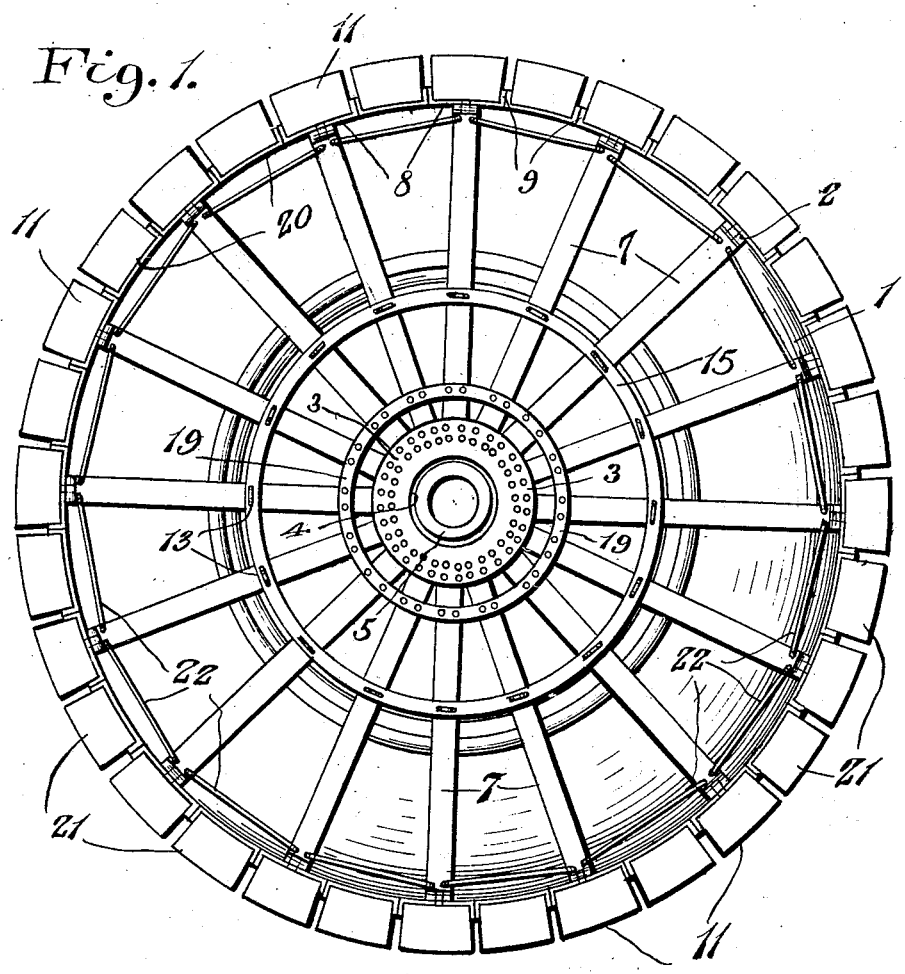
Figure 2:
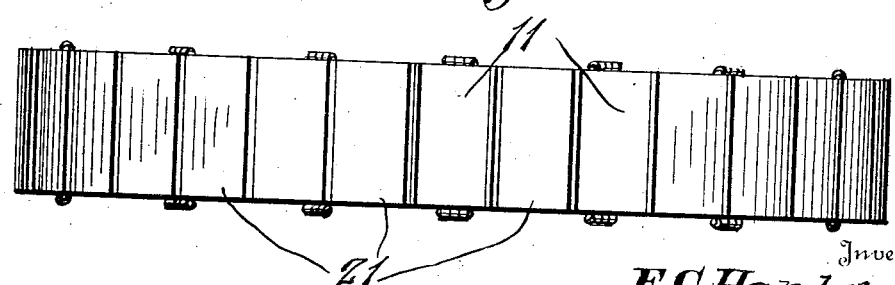

Figure 1 is a side elevation of a vehicle wheel showing the improved armor mounted thereupon. Fig. 2 is a top plan view of the wheel shown in Fig. 1. Fig. 3 is a cross sectional view through a fragment of the improved wheel armor. Fig. 4 is a detail perspective view of a part of the skeleton frame. Fig. 5 is a cross sectional view through a fragment of the armor taken at right angles to the view shown in Fig. 3, and Fig. 6 is a detail perspective view of an auxiliary part of the skeleton frame of the armor.

Referring more particularly to the drawings, 1 designates an ordinary type of wheel having a pneumatic tire mounted thereupon, used upon automobiles or like vehicles, and 2 designates the armor therefor as an entirety.
The armor 2 embodies a plurality of circular metallic plates 3, which are secured to each other in spaced relation, and are provided with centrally disposed openings 4, which receive the hub 5 of the wheel 1. The plates 3 are secured together by a plurality of bolts 6 which extend transversely therethrough, and through the inner end of a plurality of metallic spokes 7. The spokes 7 are constructed of flat sheet metal, and they extend radially from the central axis of the vehicle wheel 1 and consequently of the plates 3. The spokes 7 have hingedly secured to their outer terminal ends plates 8. The plates 8 have their marginal side edges upturned as is shown at 9 and provided with bolt holes 10, through which bolts are inserted for attaching tread blocks 11 to the plates. The plates 8 have spokes 12 hingedly connected to their ends oppositely of the ends to which the spokes 7 are connected. The spokes 12 are comparatively shorter than the spokes 7, and they have their inner ends connected to the spokes 7 by transversely extending bolts 13, which extend through the spokes 7 and through bolt holes 14 formed in the ends of the spokes 12. The bolts 13 are U-shaped having their apexes engaging the outer surface of the spokes 7. Reinforcing bands or rings 15 and 16 are secured to the inner surface of the spokes 7 and 12 respectively, and are held in engagement therewith by nuts 18 which are mounted upon the transversely extending bolts 13.

A reinforcing ring 19 is secured to spoke 7 intermediate of the rings 15 and the peripheries of the disks 3 and connects each and every one of the spokes 7 for preventing independent movement thereof.

The plates 8 are circumferentially spaced with relation to each other about the circumference of the wheel 1, and they have connected thereto and positioned intermediate of their facing sides auxiliary plates 20, which have secured thereto tread blocks 21, which are identical in construction to the tread blocks 11.

The spokes 7 and 12 are connected to the ones next thereto, by wire or metallic rods 22. The rods 22 are connected to the spokes 7 and 12 by the insertion of their ends through openings 23 formed in the spokes a short distance inwardly from the plates 8 and the rods form braces for bracing the outer ends of the spokes.

The various tread blocks 21 and 11 are spaced a short distance from each other, leaving a space intermediate of their facing sides, as is clearly shown in Fig. 1 of the drawings, and this forms a tread for a vehicle wheel which has gripping proclivities for facilitating the travel of the wheel and the vehicle upon which it may be mounted through sand, mud or soft soil.

From the foregoing description taken in connection with the accompanying drawings the advantages of construction and of the method of operation of the improved tire armor will be readily apparent to those skilled in the art to which this invention appertains and, while in the foregoing description, the principle of the operation of this invention has been described together with various other features of construction, it is to be understood that certain minor features of construction, combination and arrangement of parts may be altered to suit practical conditions provided such alterations are comprehended within the scope of what is claimed.

What is claimed is:—

1. The combination with a vehicle wheel having a hub and a pneumatic tire mounted thereon, of a plurality of plates and a plurality of radiating spokes having their inner ends secured to said plates, said spokes being constructed of flat sheet metal, transversely extending plates hingedly connected to the outer ends of said spokes, auxiliary spokes connected to said plates oppositely of said first named spokes, and a plurality of tread blocks secured to said transversely extending plates in spaced circumferential relation with each other about the circumference of said tire.

2. The combination with a vehicle wheel embodying a hub, and a pneumatic tire mounted upon the periphery thereof, of a pair of plates, said plates being spaced from each other and having inserted therebetween and securely attached thereto the inner ends of a plurality of radiating spokes, said spokes being constructed of flat sheet metal, transversely extending plates hingedly connected to the outer ends of said spokes, auxiliary spokes of shorter length than said first named spokes hingedly connected to said transversely extending plates oppositely of said first named spokes, a plurality of bolts connecting the inner ends of said auxiliary spokes to said first named spokes, reinforcing rings secured to the inner surface of said auxiliary spokes and said first named spokes, and tread blocks carried by said transversely extending plates in spaced relation about the circumference of said vehicle wheel.

3. The combination with a vehicle wheel having a hub and a pneumatic tire mounted upon the periphery thereof, of a pair of plates, said plates being spaced from each other and having inserted therebetween and securely attached thereto the inner ends of a plurality of radiating spokes, said spokes being constructed of flat sheet metal, transversely extending plates hingedly connected to the outer ends of said spokes, auxiliary spokes of shorter length than said first named spokes hingedly connected to said transversely extending plates oppositely of said first named spokes, a plurality of bolts connecting the inner ends of said auxiliary spokes to said first named spokes, reinforcing rings secured to the inner surface of said auxiliary spokes and said first named spokes, and tread blocks carried by said transversely extending plates in spaced relation about the circumference of said vehicle wheel, auxiliary plates secured to said transversely extending plates intermediate of the plates, and tread blocks secured to said auxiliary transversely extending plates.

In testimony whereof I affix my signature in presence of two witnesses.

ELIAS C. HAMBY.

Witnesses:
CLAUDE S. ROGERS,
JOHN WILLIAMS.